United States Patent
Ryan (10) Patent No.: US 9,621,927 B2
(45) Date of Patent: Apr. 11, 2017

(54) VIDEO ADVERTISING INSERTION USING MULTIPLE PROCESSES

(71) Applicant: AdGorilla LLC, Littleton, CO (US)

(72) Inventor: Daniel Scott Ryan, Littleton, CO (US)

(73) Assignee: ADGORILLA LLC, Littleton, CO (US)

( * ) Notice: Subject to any disclaimer, the term of this patent is extended or adjusted under 35 U.S.C. 154(b) by 0 days.

(21) Appl. No.: 14/644,329

(22) Filed: Mar. 11, 2015

(65) Prior Publication Data
US 2016/0269761 A1 Sep. 15, 2016

(51) Int. Cl.
*H04N 5/445* (2011.01)
*H04N 21/234* (2011.01)

(52) U.S. Cl.
CPC .............................. *H04N 21/23424* (2013.01)

(58) Field of Classification Search
CPC ................................................. H04N 21/23424
USPC ............................................................ 725/42
See application file for complete search history.

(56) References Cited

U.S. PATENT DOCUMENTS

| 2007/0240602 | A1* | 10/2007 | Dion ...................... G06Q 30/02 104/89 |
| 2011/0096845 | A1* | 4/2011 | Mamidwar ........ H04N 21/4305 375/240.26 |
| 2015/0304196 | A1* | 10/2015 | Sun ...................... H04L 43/0876 709/219 |

* cited by examiner

*Primary Examiner* — Michael Hong
(74) *Attorney, Agent, or Firm* — Polsinelli PC (57) ABSTRACT

A system for video advertising insertion is presented. In one example, the system includes a transport stream interface to receive multiple video program channels in at least one first video transport stream. The system also includes at least one hardware processor that executes a host process to initiate a plurality of instance processes to execute concurrently, wherein each of the instance processes is assigned a distinct subset of the channels. Each of the instance processes analyzes the at least one first video transport stream to determine advertisement insertion points of the distinct subset of the channels, and inserts at least some of the plurality of video advertisements into the distinct subset of the channels based on the advertisement insertion points and an advertising schedule. The transport stream interface is also to transmit the channels with the inserted video advertisements in at least one second video transport stream.

21 Claims, 9 Drawing Sheets

VIDEO ADVERTISING INSERTION USING MULTIPLE PROCESSES

TECHNICAL FIELD

Aspects of the present disclosure relate generally to video advertising insertion technology and, more specifically, to a multiple-process video advertising insertion system.

BACKGROUND

Television or video distribution systems, such as terrestrial ("over the air"), cable, and satellite television systems, provide many programs (e.g., television series, news programs, movies, sporting events, and like) by way of multiple program channels that deliver such programming simultaneously. An important aspect of these television distribution systems is the revenue generated by advertising (e.g., commercials) presented in conjunction with the television programs of interest, as such revenue is often necessary to make the production and distribution of such programming possible.

In some environments, locally-oriented advertising may be inserted into at least some of the video programs, often as a replacement for nationally-oriented advertisements initially placed in the programs. To insert the local advertising, the various program channels may be received into a router that is also in communication with an advertisement server via a communication network. The router may then retrieve advertisements from the advertisement server and insert the advertisements into the programs before retransmitting the programs over their respective channels via one or more communication connections to televisions, television set-top boxes, and the like.

Given the amount of video and audio data often associated with the video program channels, the router may require significant processing power to insert the local advertising at appropriate points in time of the various programs while avoiding processing bottlenecks that may cause data loss or interruption of service, such as, for example, video data buffer overruns and/or underruns. However, the purchase or lease costs typically associated with high-performance processing hardware may be beyond the financial reach of many television distribution systems that serve smaller viewer markets.

It is with these observations in mind, among others, that aspects of the present disclosure were conceived.

SUMMARY

One aspect of the present disclosure involves a system and method for inserting video advertisements into multiple video program channels of at least one first video transport stream based on an advertising schedule. A host process may initiate multiple instance processes to execute concurrently on one or more processors, wherein each of the instance processes may be assigned a distinct subset of the multiple video program channels. Each of the instance processes may analyze the first video transport stream to determine advertisement insertion points of the subset of video program channels assigned to the instance process, and may insert at least some of the advertisements into the assigned subset of video program channels based on the advertisement insertion points and the advertising schedule. The multiple video program channels may then be transmitted with the inserted video advertisements in at least one second video transport stream. Other potential aspects of the present disclosure are described in greater detail below.

BRIEF DESCRIPTION OF THE DRAWINGS

Exemplary embodiments are illustrated in referenced figures of the drawings. The embodiments and figures disclosed herein are intended to be considered illustrative rather than limiting. The use of the same reference numerals in different drawings indicates similar or identical items.

DETAILED DESCRIPTION

Figure 1:
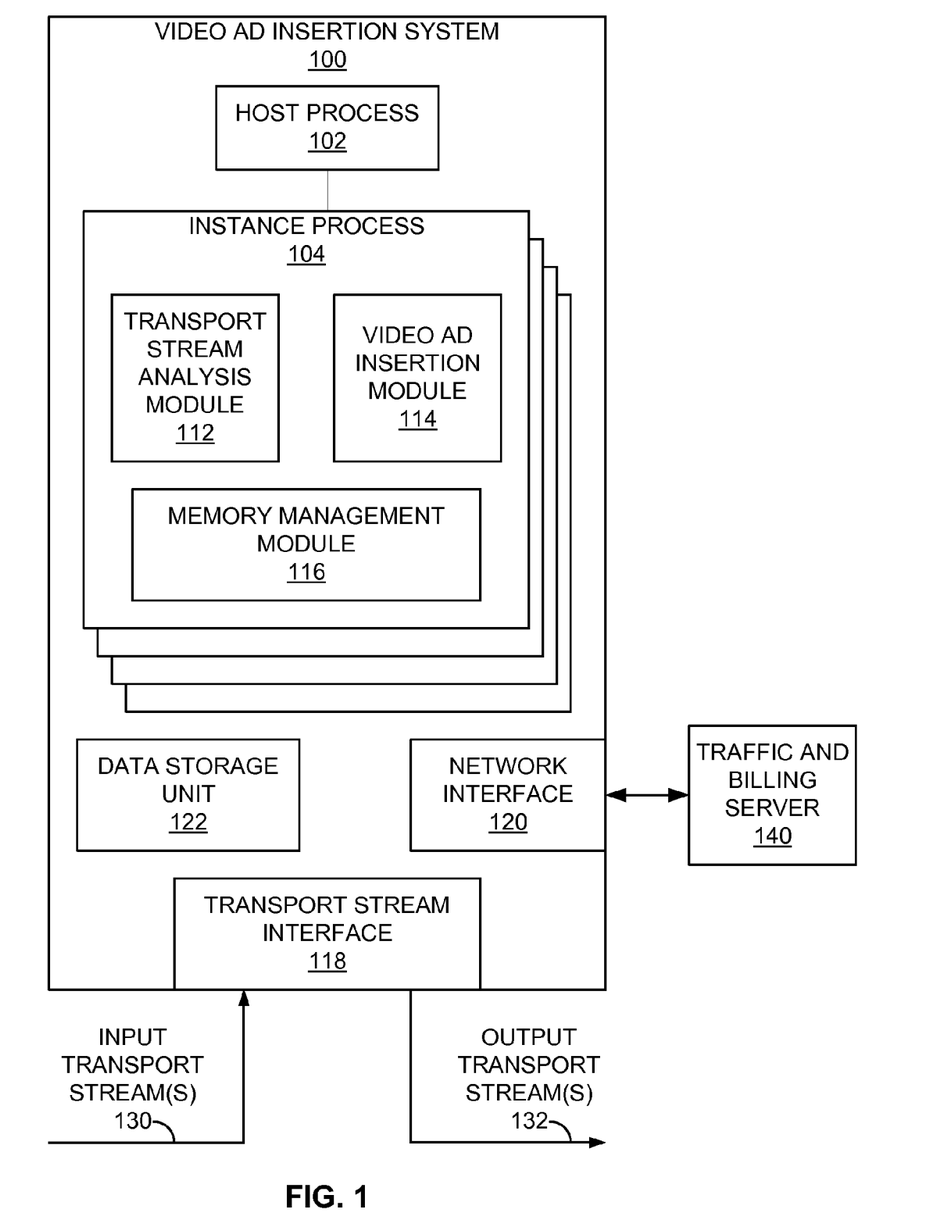
FIG. 1 is a block diagram of an example video advertisement insertion system.

Aspects of the present disclosure involve a computing system and methodology for inserting advertising, such as local advertising, into a transport stream carrying some form of programming signal such that the programming and the advertising may be provided to a viewer system. FIG. 1 is a block diagram of an example video advertisement insertion system 100. The video advertisement insertion system 100 may include a transport stream interface 118, a network interface 120, and a data storage unit 122. In addition, the video advertisement insertion system 100 may include one or more hardware processors (e.g., microcontrollers or microprocessors) along with memory (e.g., flash memory, read-only memory (ROM), dynamic random-access memory (DRAM), static random-access memory (SRAM), hard disk drive memory, optical disk drive memory, and so on) (not explicitly depicted in FIG. 1) having stored thereon instructions for the one or more hardware processors. Executable on the processors are a host process 102 and multiple instance processes 104 that may operate concurrently or simultaneously to perform various functions described in greater detail below. In other examples, the video advertisement insertion system 100 may further include other modules or components, such as, for example, a user input interface (e.g., a keyboard, a pointer device, and a microphone), a user output interface (e.g., a display unit and a speaker), a power supply, and the like. However, such modules or components are not depicted or discussed herein to simplify and focus the following discussion.

As is described more fully below, the video advertisement insertion system 100, in some examples, may be configured to receive at least one transport stream carrying one or more channels of video programs, to insert video advertisements within the programs (e.g., as replacements for other advertisements or content provided in the at least one transport stream, and then transmit the one or more transport streams with the inserted advertisements by way of a communication network or connection to a television, television set-top box, or other component capable of storing and/or presenting the associated video content. (Generally, in the discussion provided herein, a transport stream carrying video information may be referred to as a "video transport stream," although such a transport stream may carry audio information and other forms of data in addition to video information.) Further, in some embodiments, each of the received channels may be allocated or assigned to a particular one of the multiple instance processes 104 executing concurrently or simultaneously on the video advertisement insertion system 100. Consequently, various tasks performed during the advertisement insertion process, including, but not limited to, management of memory allocated to each of the instance processes 104, may occur on a process-by-process basis, thus decomposing such tasks into smaller, shorter tasks, thereby possibly facilitating a shorter response time to service other, more time-critical or time-intensive tasks, such as the filling and emptying of data buffers carrying data associated with the input transport streams 130 and the output transport streams 132, or executing garbage collection routines. These and other advantages will be recognized from the discussion set out herein.

Continuing with FIG. 1, the transport stream interface 118 may be configured to receive one or more input transport streams 130 over a communication connection or network, and to transmit one or more output transport streams 132 over the same or different communication connection or network. Each of the one or more input transport streams 130 may include video and audio data for one or more video program channels, such as, for example, major network channels, sports channels, movie channels, special interest channels, and so forth. In addition, the one or more input transport streams 132 may include information indicating at which points in the programs one or more video advertisements may be inserted. As is described hereafter, the video advertisement insertion system 100 may insert the video advertisements based on the insertion point information, and then transmit the programs with the inserted advertisements in the one or more output transport streams 132.

In one embodiment, the one or more input transport streams 130 are received from a programming source, such as a terrestrial or cable television station or network, a satellite television distribution system, or a cable television head-end. The one or more output transport streams 132 may be transmitted to a cable television head-end or other television distribution system, or more directly to one or more electronic devices capable of decoding and/or displaying the video and/or audio content of the output transport streams 132, such as, for example, televisions, television set-top boxes, smartphones, desktop computers, laptop computers, tablet computers, and gaming systems. The transport stream interface 118, in one example, may include interfacing circuitry for Asynchronous Serial Interface (ASI) over a coaxial connection and for Internet Protocol (IP) over Ethernet (e.g., Gigabit Ethernet) connections, although the transport stream interface 118 may be configured for compatibility with other networks or communication protocols. Further, the transport stream interface 118 may include one or more physical ports by which wired or wireless connections to a communication network may be made to receive and transmit the transport streams 130, 132. Additionally, such physical ports may be bidirectional so that one or more of the input transport streams 130 and the output transport streams 132 may be received or transmitted using the same physical port.

In addition, the transport stream interface 118 may include or be associated with one or more input buffers to receive and store data from the input transport streams 130, as well as one or more output buffers to store and subsequently transfer data for the output transport streams 132.

The network interface 120 may be configured to communicate with a traffic and billing server 140 that may provide, for example, video advertisement scheduling information and a plurality of video advertisements to be inserted into video programs or channels of the input transport streams 130. The scheduling information, in one embodiment, may include information for each video advertisement regarding particular acceptable days and/or times during which the video advertisement may be shown, as well as the particular program channel into which the video advertisement is to be inserted. In other examples, the scheduling information may include particular limitations or restrictions regarding the scheduling of the advertisement, such as a particular geographical area within in which the advertisement is to be viewed.

In other examples, the network interface 120 may be coupled to other servers or systems instead of, or in addition to, the traffic and billing server 140. In some examples, the network interface 120 may provide information to the traffic and billing server 140 as to which advertisements were actually inserted and distributed into the output transport streams 132 for presentation to viewers so that the advertisers may be billed appropriately.

In some examples, the network interface 120 may be an Ethernet connection (e.g., a Gigabit Ethernet connection) for communicating over a local area network (LAN), a wide area network (WAN) (e.g., the Internet), or another network. In one example, the network interface 120 may be integrated within the transport stream interface 118 so that one or more physical connections, such as an Ethernet connection, may be employed for the transport streams 130, 132, the video advertisements, and the scheduling information.

The data storage unit 122 may be configured to store information included within, or generated from, the input transport streams 130 and the output transport streams 132. Also stored in the data storage unit 122 may be the advertisements and/or the scheduling information retrieved from the traffic and billing server 140 via the network interface 120, in some embodiments. The data storage unit 122 may include one or more types of data storage media, including, but not limited to, hard disk drive media, optical disk media, flash memory, DRAM, SRAM, and other types of recordable non-volatile and volatile memory. Also, while the data storage unit 122 is depicted in FIG. 1 as being incorporated within the video advertisement insertion system 100, the data storage unit 122, or some portion thereof, may be located external to the video advertisement insertion system 100 and coupled thereto via a communication connection.

Executing on one or more hardware processors (not shown in FIG. 1) of the video advertisement insertion system 100 may be a host process 102 and multiple instance processes 104. In one example, the host process 102 and the instance processes 104 execute atop an operating system running in the video advertisement insertion system 100. In further embodiments, the host process 102 may be a background service that is intended to execute indefinitely. Such a service may not require a user being logged into the operating system to execute, and may not provide a user interface. In some examples, the host process 102 may perform one or more duties that are applicable to the general operation of the video advertisement insertion system 100, such as error recovery tasks.

After execution initiation, the host process 102 may initiate the instance processes 104, which may be client instances of the host process 102 that execute concurrently or simultaneously with each other, and with the host process 102. In one example, an equal or near-equal number of different or distinct program channels of the one or more input transport streams 130 may be assigned to each of the instance processes 104 to distribute the processing of the program channels substantially evenly across the instance processes 104. In other examples in which some of the program channels may require more processing than other (e.g., high definition program channels, sports channels, and action movie channels), fewer such program channels may be assigned to an instance process 104 compared to channels carrying less-demanding content. In one example, the host process 102 may communicate with the instance processes 104 using named pipes or other inter-process communication mechanisms.

In one embodiment, the instance processes 104 may employ a plurality of individual execution threads configured to execute concurrently or simultaneously with other execution threads of the same instance process 104 or of other instance processes 104. Each of the instance processes 104 may perform several operations, possibly by way of the execution threads, including, but not limited to, de-multiplexing the input transport streams 130 into individual channel streams, analyzing the individual channel streams to determine potential advertisement insertion points in the individual channels, inserting video advertisements at the determined insertion points of the channels, and re-multiplexing the channels into output transport streams 132 for transmission via the transport stream interface 118. In some examples, one or more of these operations may be performed by way of individual modules such as a transport stream analysis module 112 and a video advertisement insertion module 114. The operation of these modules 112, 114 is discussed further with respect to FIG. 3. Other tasks, such as memory management, may occur on a process-by-process basis, such as by way of a memory management module 116. Other types of modules related to particular tasks or functions of an instance process 104 may be included in, or executed by, each instance process 104, but are not explicitly described in detail herein. For example, each instance process 104 may also perform grooming (e.g., rearrangement and alteration of transport stream packets for improved video decoder operation), clamping (e.g., removal of some transport stream packets to maintain data rates below some predefined level), and/or other operations involving the output transport streams 132 or the data carried therein.

In one implementation, the operating system that executes atop the hardware of the video advertisement insertion system 100 may be a desktop edition, server edition, or other form of Microsoft® Windows®. Accordingly, the host process 102 may be initiated as a Windows® service that starts once the operating system begins execution, and may operate in the background as long as the operating system continues to operate. Once executing, the host process 102 may then initiate each of the instance processes 104 as client processes of the host process 102. In one example, the instance processes 104 may be not executed as Windows® services, but may communicate with the other portions of the system 100 via the host process 102.

Continuing with this same example, the host process 102 and the instance processes 104 may be configured to operate within the Microsoft® Windows® .NET Framework, which provides substantial support by way of preexisting code libraries for various common services, such as exception handling and memory management. Accordingly, each instance process 104 may access and implement functions related to these services, such as garbage collection (e.g., de-allocation of previously allocated, but no longer used, memory in the instance process 104), as they relate to that particular instance process 104. By employing garbage collection, and possibly other functions, on a process-by-process basis, as opposed to across the entire video advertisement insertion system 100, such functions may be decomposed into more frequent, but shorter, tasks, thus possibly reducing response time of the instance processes 104 to attend to time-critical tasks, such as data buffer operations involving the input transport streams 130 and the output transports streams 132. In some examples, a continuous execution time of approximately one second or less for each instance process 104 before relinquishing control to another instance process 104 or the host process 102 facilitates timely buffer data management and other process-related duties. In one example, limiting execution times in such a manner may be facilitated by the host process 102 initiating a sufficient number of instance processes 104 such that each continuous execution of each instance process 104, including garbage collection and other functions associated with that instance process 104, consumes one second or less of time.

To access such functions by way of the .NET Framework, the host process 102 and the instance processes 104 may be written in a programming language that effectively interfaces with the libraries that provide or enhance the functionality discussed above, such as, for example, C# (pronounced "C-sharp"). However, other operating systems, software frameworks, and programming languages providing such functionality may be employed in other embodiments.

In one example, the video advertisement insertion system 100, including the various components described above, may be configured to reside within an enclosure that adheres to a rack-mountable electronics standard, such as the 19-inch rack standard often employed in the electronics industry. In one particular embodiment, the enclosure may be a 4 U (rack unit) rack-mountable chassis.

Figure 2:
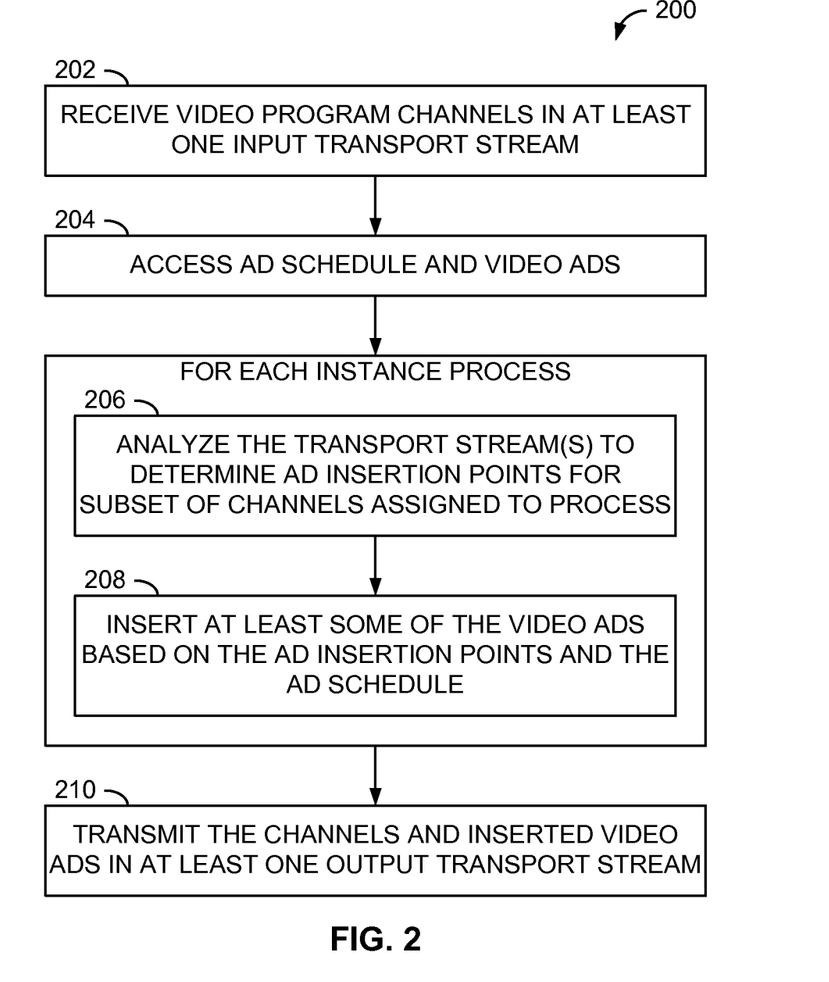
FIG. 2 is a flow diagram of an example method of inserting video advertisements into a video transport stream.

FIG. 2 is a flow diagram of an example method 200 of inserting video advertisements into a video transport stream. In the discussion presented below, the method 200 is described in conjunction with the video advertisement insertion system 100, although other particular systems or devices not specifically discussed herein may also be employed to similar effect. In the method 200, multiple video program channels are received at the transport stream interface 118 in at least one input transport stream 130 (operation 202). In one example, multiple input transport streams 130 are received, with each input transport stream 130 including transport stream data for one or more program channels, such as, for example, one or more major network (e.g., ABC, CBS, NBC, Fox) affiliate stations, news channels (e.g., CNN, FNC, CNBC), sports channels (e.g., ESPN, ESPN2), movie channels (e.g., HBO, SHOWTIME), and so on. Video advertisement scheduling information and a plurality of video advertisements (including video and audio data) may be retrieved via the network interface 120 (operation 204) and stored in the data storage unit 122. As mentioned above, the video advertisement scheduling information may include, for example, information regarding acceptable days and/or times during which a particular video advertisement may be shown, the particular program channel into which the video advertisement is be inserted, and/or information regarding limitations or restrictions on the scheduling of the advertisement, such as specific geographical areas within in which the advertisement is to be presented.

Each instance process 104, to which a particular subset of the program channels carried on the input transport streams 130 may be assigned, may then process portions of data from the input transport streams 130 that carry those specific channels. For example, the instance process 104 may analyze those input transport streams 132 to determine advertisement insertion points that are available for those channels (operation 206). Based on the determined insertion points, and on the retrieved video advertisement schedule, the instance process 104 may insert the appropriate advertisements into those channels for which the instance process 104 has responsibility (operation 208). Each of the instance processes 104 may perform other functions as well, such as de-multiplexing of the input transport streams 130 into single-channel transport streams for the those channels assigned to the instance process 104, re-multiplexing of the single-channel streams transport streams into the output transport streams 132, memory management (e.g., memory allocation and garbage collection) for the instance process 104, and the like.

After the video advertisements are inserted, the transport stream interface 118 may transmit the program channels with the inserted advertisements as the output transports streams 132 (operation 210).

While the operations 202-210 are depicted as operations performed in a particular sequence, the operations 202-210 may be performed as part of a pipelined operation structure in which the operations 202-210 are performed repeatedly or continually, with the input transport streams 130 and the output transport streams 132 being received and transmitted in a continual manner. Further, each of the operations 206, 208 performed by each of the instance processes 104 may be performed in a concurrent or simultaneous manner on different program channels, or different sets of program channels, possibly by way of individual execution threads running in one or more of the instance processes 104.

Figure 3:
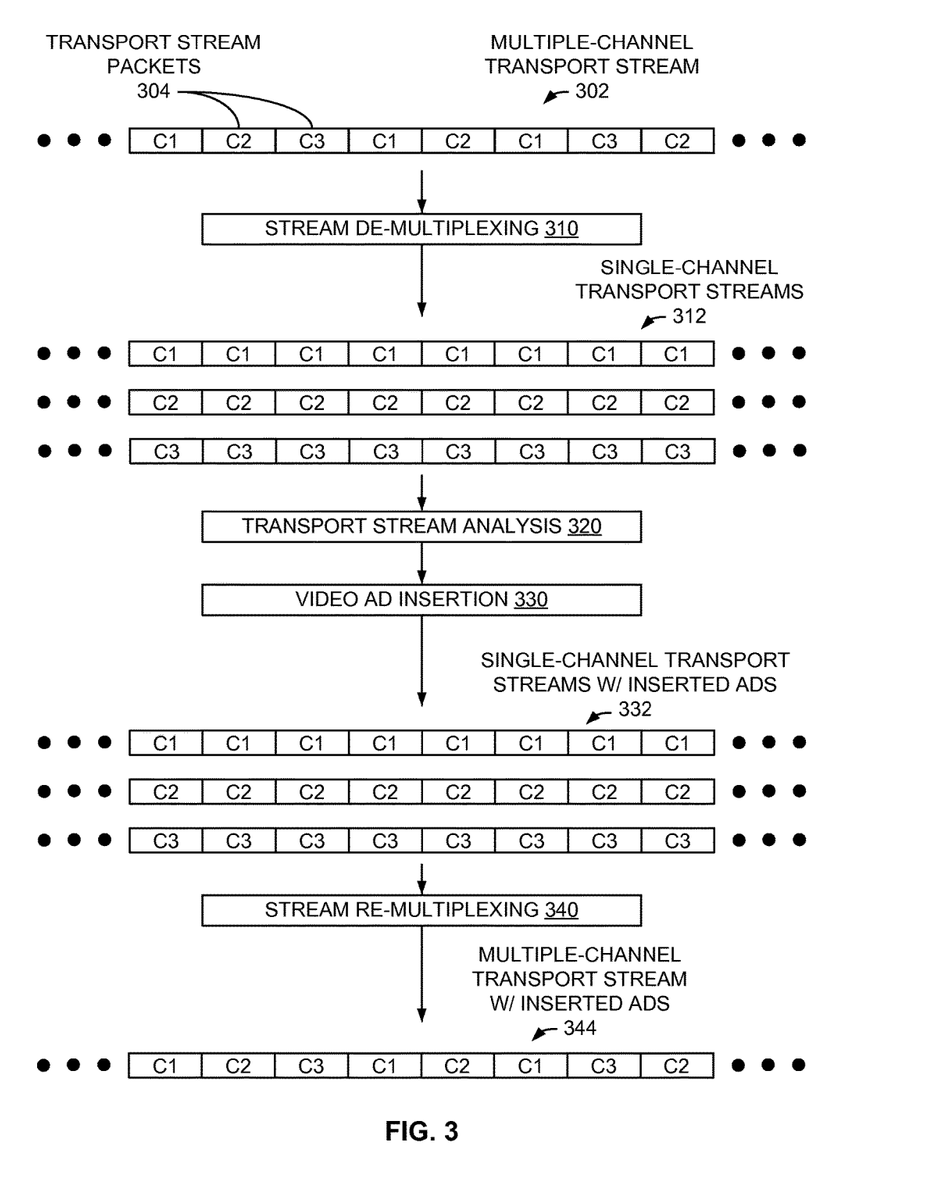
FIG. 3 is a graphical representation of example de-multiplexing and re-multiplexing of video transport streams in conjunction with the insertion of video advertisements.

FIG. 3 is a graphical representation of example de-multiplexing and re-multiplexing of the input transport streams 130 and the output transport streams 132, respectively, in conjunction with the insertion of video advertisements. An example of one of the input transport streams 130 is depicted in FIG. 3 as a multiple-channel transport stream 302 containing individual transport stream packets 304 for each of a first channel (C1), a second channel (C2), and a third channel (C3). In an example, the multiple-channel transport stream 302 may be a transport stream (TS) carrying Motion Picture Experts Group 2 (MPEG-2) data, MPEG-4 data, or audio, video, and advertisement insertion information conforming to another audio/video format. Further, each of the packets for a particular channel may be associated with a particular packet type, and thus a particular packet ID (PID). The particular packet types may include video packets having a first PID, audio packets having a second PID, and digital program insertion (DPI) packets having a third PID.

An example of the DPI packets conforms to the Society of Cable Telecommunications Engineers 35 (SCTE 35) standard. According to that standard, the DPI packets may define "in" points and "out" points for both the audio and video of the particular program channel, in which an in point indicates a point in the original audio or video packet stream at which the audio or video of the advertisement or other program may start to replace the original audio or video. Conversely, an out point indicates a point in the original audio or video packet stream at which the audio or video of the advertisement or other program ceases its replacement of the original audio or video. The in points and out points may be specified in the DPI packets by way of presentation time stamps (PTSes), which are values of a reference clock (e.g., a 27 megahertz (MHz) reference clock) that are also carried in the audio and video packets of the same program channel. In many cases, DPI packets are received eight to ten seconds ahead of the audio and video packets corresponding to the in points and out points specified in the DPI packets.

Other types of information may be carried in other packet types. For example, one packet type may carry a Program Association Table (PAT) that identifies each of the programs or channels available in its corresponding input transport stream 130 by way of a unique program number. Each identified program or channel may also be associated with a Program Map Table (PMT) carried in other packet types, with the PMT specifying the PIDs for the audio, video, and DPI packets for that program or channel. Based on this information, the instance process 104 to which this channel is assigned may identify and analyze the DPI packets to determine the insertion points (e.g., the in points and out points) for that channel.

As shown in FIG. 3, the packets of each channel in the multiple-channel transport stream 302 may not be provided in a particular order, such as interleaved (e.g., C1, C2, C3, C1, C2, C3, etc.), but may appear to be arranged in a more randomized order. To process each channel assigned thereto, each instance process 104 may access the input/output (I/O) port of the transport stream interface 118 at which the multiple-channel transport stream 302 is received to retrieve the packets identified in the PMTs of its assigned channels in a stream de-multiplexing operation 310, resulting in a single-channel transport stream 312 for each of the channels C1, C2, and C3 assigned to the instance process 104. In this example, each of the channels C1, C2, and C3 of the multiple-channel transport stream 302 are assigned to the same instance process 104. In other examples, the channels C1, C2, and C3 of the multiple-channel transport stream 302 may be assigned to two or more instance processes 104. As a result, those instance processes 104 may access the I/O port receiving the multiple-channel transport stream 130 as a shared resource.

The instance process 104 may then perform its transport stream analysis 320 to determine the insertion points (e.g., the in points and out points) specified in the DPI packets of each of the single-channel transport streams 312. Using the video advertisements and the video advertisement schedule previously retrieved, the instance process 104 may perform video advertisement insertion 330 on each of the single-channel transport streams 312 based on the determined insertion points. In one example, the instance process 104 selects a video advertisement of an appropriate length that may replace the original video and audio of the single-channel transport stream 312 between an in point and an out point of the single-channel transport stream 312. The insertion of one or more advertisements results in a single-channel transport stream 332 with inserted advertisements for each of the channels assigned to this particular instance process 104.

Each of the instance processes 104 may then perform stream re-multiplexing 340 on the single-channel transports streams 332 that carry the inserted advertisements into one or more multiple-channel transport streams 344, which are the output transport streams 132 transmitted by the transport stream interface 118. In this example, all of the single-channel transports streams 332 are processed and re-multiplexed into one multiple-channel transport stream 344 by a single instance process 104. In other examples, the single-channel transports streams 332 may be generated by multiple instance processes 104, with those processes sharing the particular I/O port that is to carry the multiple-channel transport stream 344 to perform the stream re-multiplexing 340.

Figure 4:
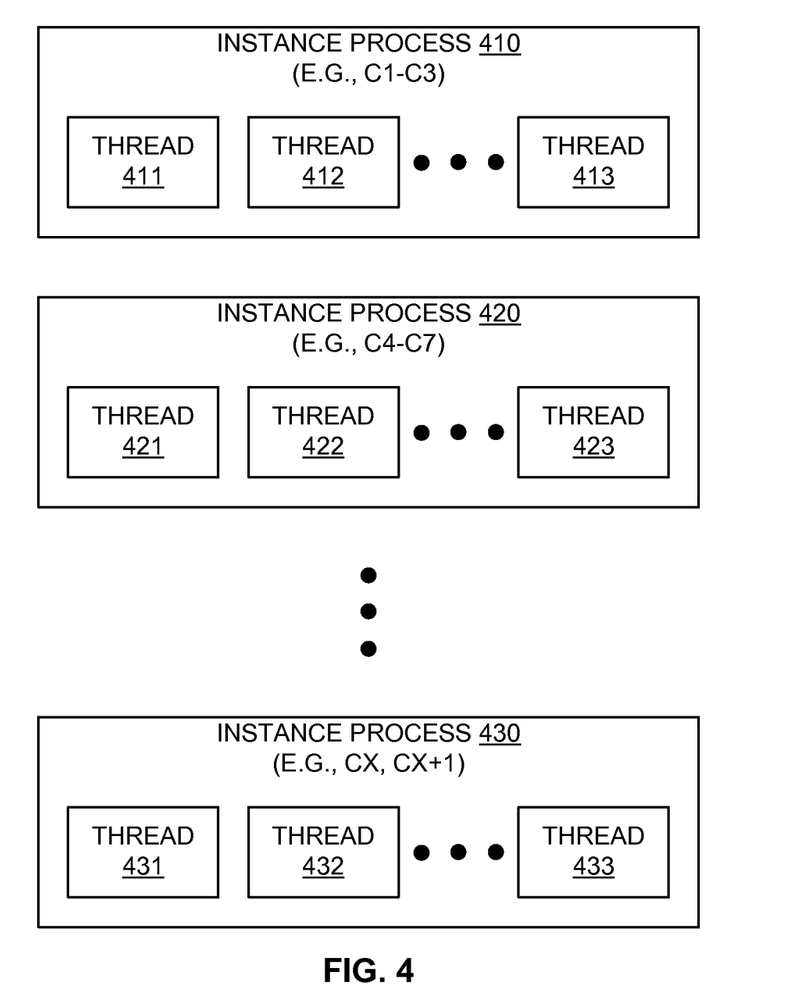
FIG. 4 is a graphical representation of example instance processes and associated execution threads employed in the insertion of video advertisements.

FIG. 4 is a graphical representation of example instance processes 410, 420, and 430, and associated execution threads that may be employed in the insertion of video advertisements. While three instance processes 410, 420, and 430 are explicitly depicted in FIG. 3, fewer or greater numbers of instances may be employed in other examples. In one example, each instance process 410, 420, and 430 may have a particular maximum amount of memory (e.g., 1 gigabyte (GB) of memory) reserved thereto for performing the various operations discussed above.

Also in this example, instance process 410 includes execution threads 411, 412, and 413; instance process 420 includes execution threads 421, 422, and 423; and instance process 430 includes execution threads 431, 432, and 433. While each instance process 410, 420, and 430 is explicitly depicted as having three execution threads, fewer or greater numbers of threads may be employed in each instance process 410, 420, and 430, and different numbers of threads may be employed in each of the instance processes 410, 420, and 430. Each of the execution threads may be configured to perform one or more particular operations associated with its respective instance process 410, 420, and 430. For example, in the instance process 410, the first thread 411 may perform the de-multiplexing the input transport streams 130 for the channels assigned to the instance process 410, the second thread 412 may perform the re-multiplexing of those channels, and the third thread 413 may perform the transport stream analysis and video ad insertion noted above. Still other threads may perform other operations, such as the grooming and clamping of the transport streams, as mentioned above. In another example, each thread 411, 412, and 413 may perform all operations associated with a particular channel assigned to the instance process 410. Other allocations of duties or operations to each of the threads 411, 412, and 413 may be utilized in other examples.

Figure 5:
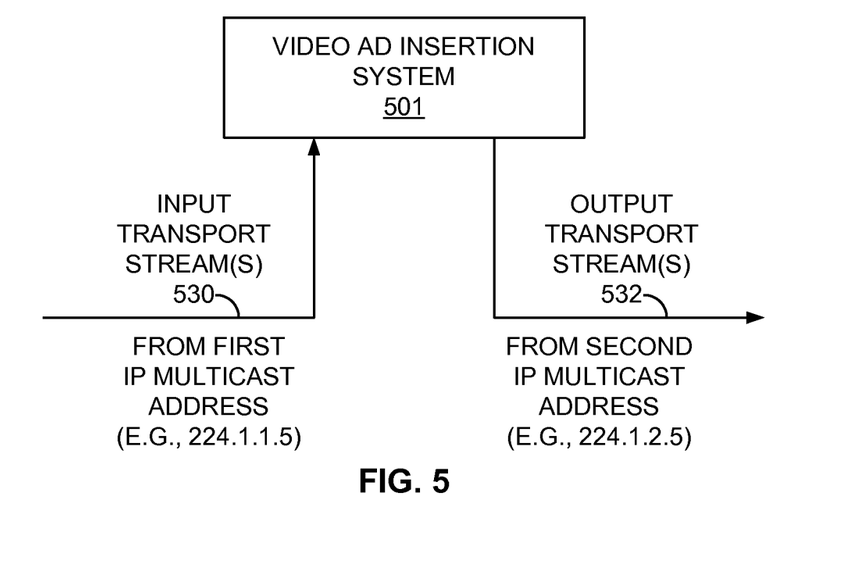
FIG. 5 is a block diagram of an example video advertisement insertion system receiving and transmitting video transport streams via IP multicast.

FIG. 5 is a block diagram of an example video advertisement insertion system 501 receiving and transmitting video transport streams via IP multicast. Generally, the use of IP multicast allows a large number of receiving devices or units of an IP network to join a group identified by an IP multicast group address. The source of a video transport stream may then transmit the stream once into the IP network so that each member of the group may receive that stream. In this example, the video advertisement insertion 501, which may be an embodiment of the video advertisement insertion system 100 of FIG. 1, may receive one or more input transport streams 530 by way of a first IP multicast group address (e.g., 224.1.1.5), possibly along with other video advertisement insertion systems, as well as other video distribution systems (not depicted in FIG. 5). After the video advertisement insertion system 501 has performed the video insertion and related operations, one or more resulting output transport streams 532, including the inserted advertisements, may be transmitted using a second IP multicast address (e.g., 224.1.2.5), to which multiple receivers (e.g., televisions, television set-top boxes, computers, tablets, smartphones, and gaming systems) may join to receive the output transport streams 532. In other examples, the video advertisement insertion system 501 may receive subsets of the input transport streams 530 over different IP multicast addresses and/or transmit subsets of the output transport streams 532 over different IP multicast addresses.

Figure 6:
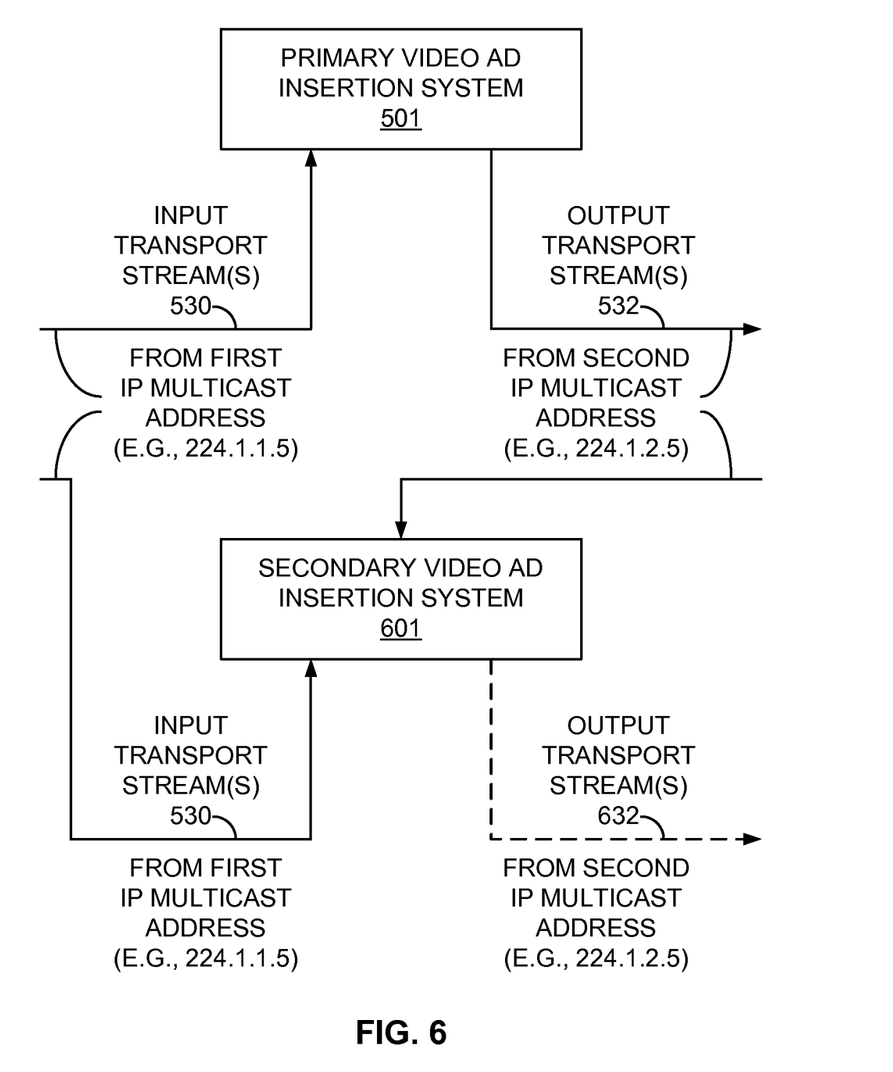
FIG. 6 is a block diagram of example primary and secondary video advertisement insertion systems receiving and transmitting video transport streams via IP multicast.

FIG. 6 is a block diagram of the video advertisement insertion system 501 of FIG. 1 operating as a primary video advertisement insertion system, and an example secondary video advertisement insertion system 601 for the receiving and transmitting of video transport streams via IP multicast. In this example, both the primary system 501 and the secondary system 601 receive the input transports streams 530 via the first IP multicast address (e.g., 224.1.1.5) and perform substantially the same advertisement insertion and other operations described above. In addition, the secondary system 601 also receives the output transport streams 532 transmitted by the primary system 501 to monitor those streams 532 to operate as a backup system to the primary system 501 by generating output transport streams 632 as a replacement for the output transports streams 532, as is described more fully below in conjunction with FIGS. 7 and 8. In one example, the secondary system 601 may join the same IP multicast group associated with the second multicast IP address (e.g., 224.1.2.5) that other receivers of the output transport streams 532 have joined to monitor the output transport streams 532. In other examples, including in non-IP environments, the secondary system 601 may receive the output transport streams 532 using other methods.

Figure 7:
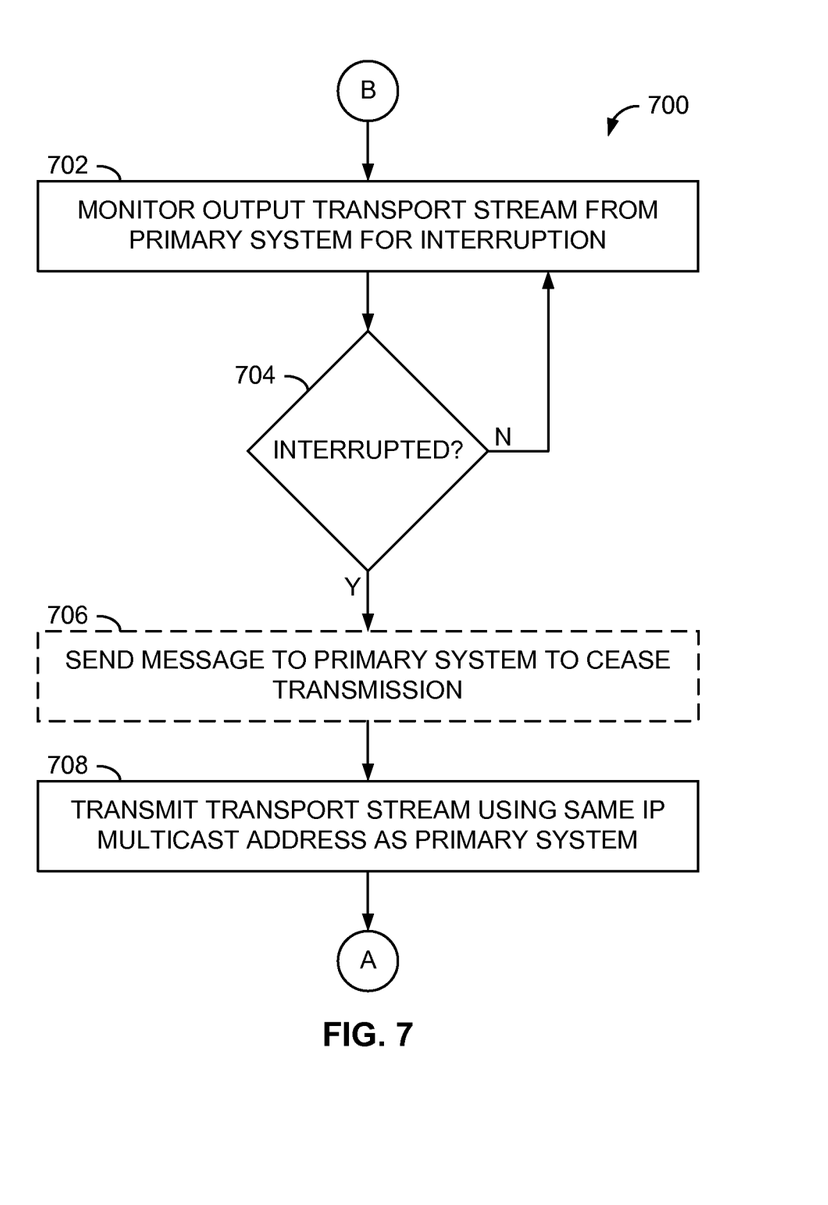
FIG. 7 is a flow diagram of an example method of employing the secondary video advertisement insertion system of FIG. 6 as a replacement system for the primary video advertisement insertion system of FIG. 6.

FIG. 7 is a flow diagram of an example method 700 of employing the secondary video advertisement insertion system 601 of FIG. 6 as a replacement system for the primary video advertisement insertion system 501 of FIG. 6. In the method 700, the secondary system 601 may monitor the output transport streams 532 of the primary system 501 (operation 702), as mentioned above, to determine if there has been any interruption in one or more of the output transport streams 532, or other problem or fault associated with the streams 532. If an interruption or other problem is not detected (operation 704), the secondary system 601 may continue to monitor the output transport streams 532 from the primary system 501. If, instead, the secondary system 601 detects an interruption or other problem with the output transport streams 532, the secondary system 601 may optionally send a message to the primary system 501 to cease or suspend transmission of the output transport streams 532 (operation 706). The secondary system 601 may employ such a message, for example, if the primary system 501 continues to issue packets for the output transport streams 532, but those packets hold incorrect video and/or audio data. Such a message may thus ensure that the primary system 501 ceases transmission of the output transport streams 532. In response to the detecting of the interruption or other fault, the secondary system 601 may transmit the one or more transport streams 632 as replacements for the output transports streams 532 based on the same input transport streams 532 that were being processed in the primary system 501 (operation 708). Further, the secondary system 601 may transmit the output transport streams 632 using the same second IP multicast address (e.g., 224.1.2.5) that was being utilized by the primary system 501 to transmit its output transport streams 532 to the receivers in the IP multicast group. Thereafter, the secondary system 601 may operate indefinitely to transmit the output transport streams 632, which include the same original programming and inserted advertisements as were to be generated at the primary system 501, until the primary system 501 is repaired and returned to service.

Figure 8:
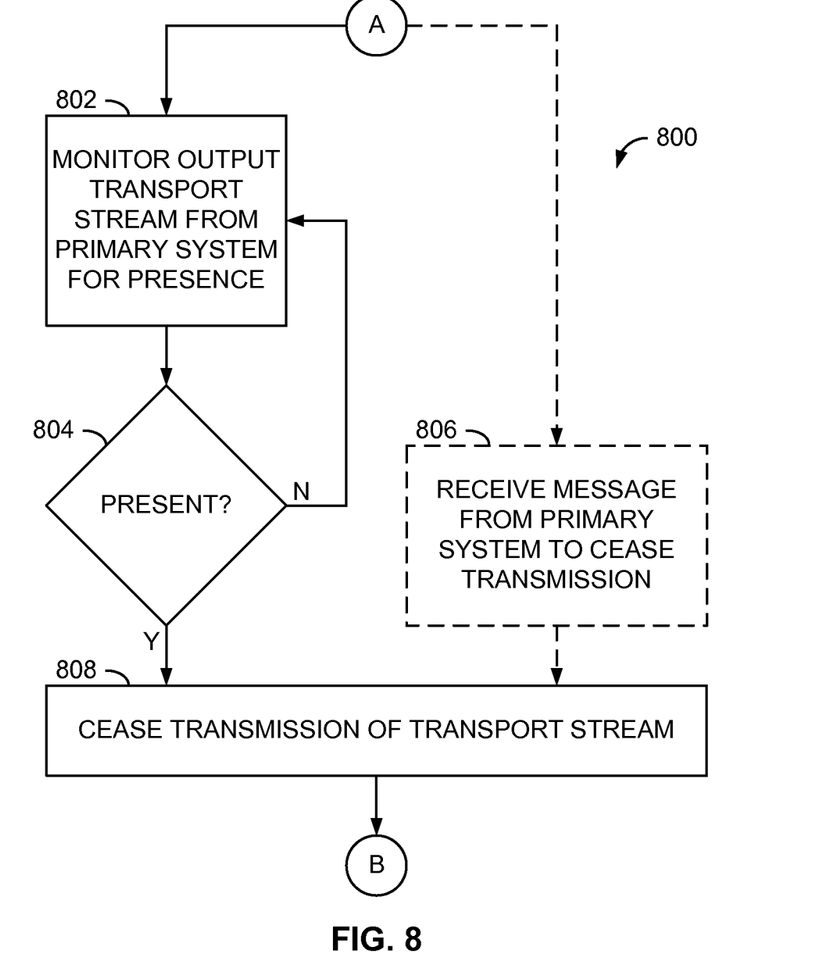
FIG. 8 is a flow diagram of an example method of re-employing the primary video advertisement insertion system of FIG. 6 in place of the secondary video advertisement insertion system of FIG. 6.

FIG. 8 is a flow diagram of an example method 800 of re-employing the primary video advertisement insertion system 501 of FIG. 6 in place of the secondary video advertisement insertion system 601 of FIG. 6. In the method 800, while the secondary system 601 is providing the output transport streams 632 via the second IP multicast address as a replacement for the output transport streams 532 of the primary system 501, the secondary system 601 may determine that the primary system 501 is being returned to service in at least one of two different ways. For example, the secondary system 601 may continue to monitor for the presence of the output transport streams 532 (operation 802) while the secondary system 601 continues to transmit the output transport streams 632. If the secondary system 601 determines that the primary system 501 is still not transmitting its output transport streams 532 (operation 804), the secondary system 601 may continue to monitor the output transport streams 532 while generating and transmitting the output transport streams 632. If, instead, the secondary system 601 determines that the primary system 501 has begun transmitting its output transport streams 532 once again (operation 804), the secondary system 601 may cease transmission of its output transport streams 632 (operation 808) and continue to monitor the output transport streams 532 of the primary system 501 (operation 702) for another interruption or other problem. In another example, the secondary system 602 may cease transmission of its output transport streams 632 (operation 808) in response to receiving an explicit message from the primary system 501 or another device that the primary system 501 has or will shortly be transmitting its output transport streams 532 once again (operation 806).

While the insertion operations discussed above have explicitly been explained as advertisement insertions, the video advertisement insertion system 100, and other embodiments discussed herein, may instead or additionally insert any other type of audio and/or video programming, such as, for example, entire programs of a half-hour in length or longer.

Figure 9:
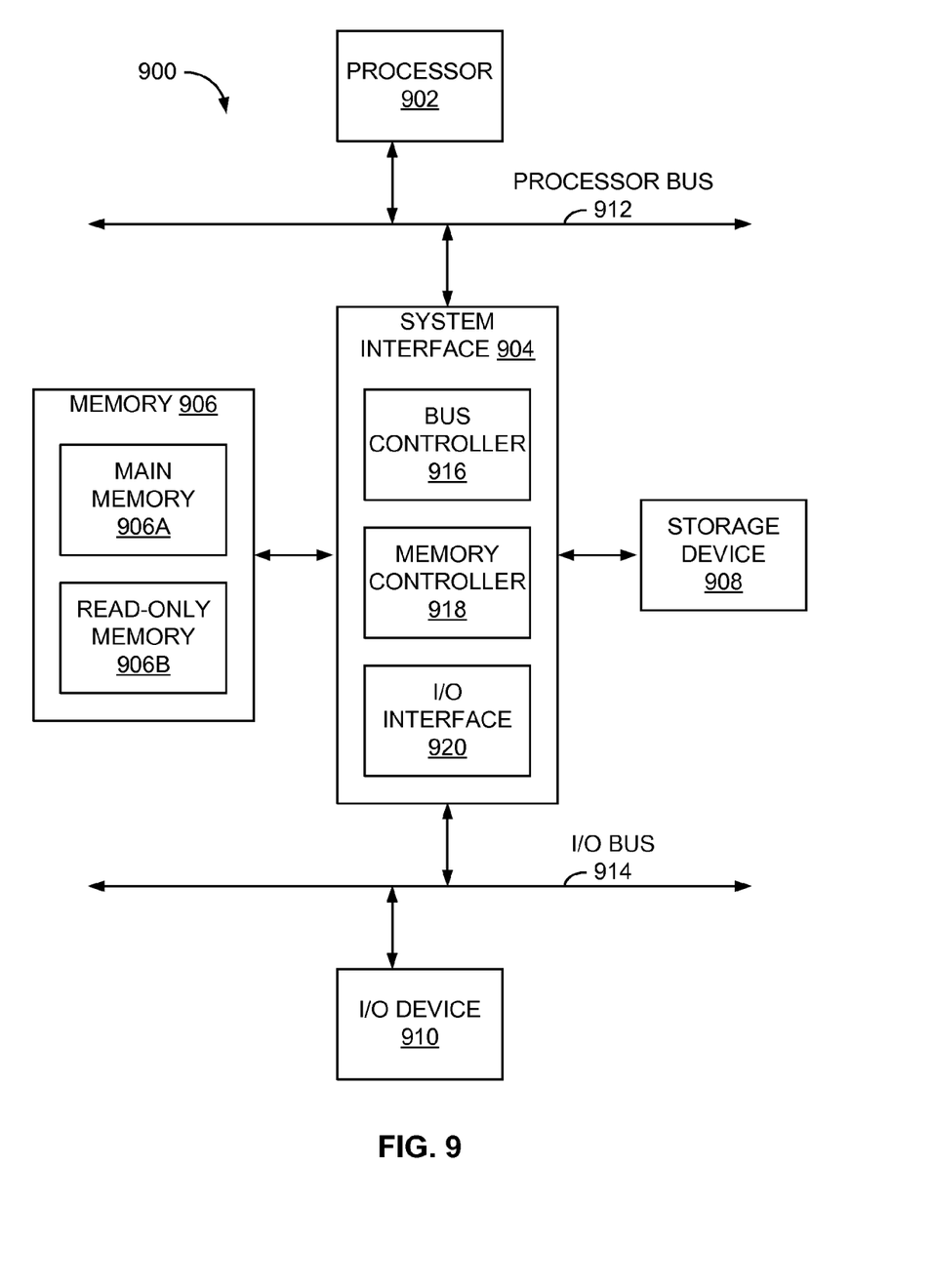
FIG. 9 is a block diagram illustrating an example of a computing system which may be used in implementing embodiments of the present disclosure.

FIG. 9 is a block diagram illustrating an example of a computing device or computer system 900 which may be used to implement the embodiments disclosed above. Embodiments disclosed herein include various operations that maybe performed by hardware modules or components, or hardware modules or components used in combination with software instructions. Moreover, as described herein, in some embodiments, a first module or component may be hardware that is programmed by one set of software or firmware instructions to perform one or more functions, while a second module or component may be that same hardware that is programmed by another set of software or firmware instructions to perform one or more other functions. As a result, the same hardware may represent the first module during one period of time, and may represent the second module during the same time or a second period of time. According to one example, the computing device or system 900 may include at least one processor 902, at least one system interface 904, at least one memory 906, at least one storage device 908, and at least one I/O device 910. The system 900 may further include at least one processor bus 912 and/or at least one input/output (I/O) bus 914.

The processor 902 may include one or more internal levels of cache (not shown in FIG. 9) and can be any known processor, such as a microprocessor, microcontroller, digital signal processor, graphics processor, or the like. The processor bus 912, also possibly known as a host bus or a front side bus, may be used to couple the processor 902 with the system interface 904. The system interface 904 may be connected to the processor bus 912 to interface various components of the system with the processor 902. System interface 904 may, for example, include a bus controller 916 or bus interface unit to direct interaction with the processor bus 912 and a memory controller 918 for interfacing the memory 906 with the processor bus 912. The system interface 904 may also include an I/O interface 920 to interface one or more I/O devices 910 with the processor 902.

The memory 906 may include one or more memory cards and control circuits (not depicted in FIG. 9). The memory 906 may include a main memory 906A and/or a read-only memory (ROM) 906B. The main memory 906A can be random access memory (RAM) or any other dynamic storage device(s) for storing information and instructions to be executed by the processor 902. Main memory 906A may be used for storing temporary variables or other intermediate information during execution of instructions by the processor 902. The read-only memory 906B can be any static storage device(s), such as Programmable Read Only Memory (PROM) chip for storing static information and instructions for the processor.

According to one embodiment, the above methods may be performed by the computer system 900 in response to the processor 902 executing one or more sequences of one or more instructions contained in the main memory 906A. These instructions may be read into main memory 906A from another machine-readable medium capable of storing or transmitting information in a form (e.g., software, processing application) readable by a machine (e.g., a computer). Execution of the sequences of instructions contained in the main memory 906A may cause the processor 902 to perform the process operations described herein.

A machine-readable media may take the form of, but is not limited to, non-volatile media and volatile media. Non-volatile media may include a mass storage device 908 and volatile media may include dynamic storage devices. Common forms of machine-readable media may include, but are not limited to, magnetic storage media (e.g. hard disk drive); optical storage media (e.g. Compact Disc Read-Only Memory (CD-ROM) and Digital Versatile Disc Read-Only Memory (DVD-ROM)), magneto-optical storage media; read-only memory (ROM); random access memory (RAM, such as static RAM (SRAM) and dynamic RAM (DRAM)); erasable programmable memory (e.g., erasable programmable read-only memory (EPROM) and electrically erasable programmable read-only memory (EEPROM)); flash memory; or other types of media suitable for storing computer or processor instructions.

Embodiments disclosed herein include various operations that are described in this specification. As discussed above, the operations may be performed by hardware components and/or may be embodied in machine-executable instructions, which may be used to cause a general-purpose or special-purpose processor programmed with the instructions to perform the operations. Alternatively, the operations may be performed by a combination of hardware, software, and/or firmware.

The performance of one or more operations described herein may be distributed among one or more processors, not only residing within a single machine, but deployed across a number of machines. In some examples, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores may be arbitrary, and particular operations are illustrated in a context of specific illustrative configurations. In general, structures and functionality presented as separate resources in the examples configurations may be implemented as a combined structure or resource. Similarly, structures and functionality presented as a single resource may be implemented as separate resources.

While the present disclosure has been described with reference to various embodiments, these embodiments are illustrative, and the scope of the disclosure is not limited to such embodiments. Various modifications and additions can be made to the exemplary embodiments discussed herein without departing from the scope of the disclosure. For example, while the embodiments described above refer to particular features, the scope of this disclosure also includes embodiments having different combinations of features, as well as embodiments that do not include all of the described features. Accordingly, the scope of the disclosure is intended to embrace all such alternatives, modifications, and variations, together with all equivalents thereof.

The invention claimed is:

1. A system for video advertising insertion, the system comprising:
    a transport stream interface to receive multiple video program channels in at least one first video transport stream;
    a network interface to access an advertising schedule and a plurality of video advertisements;
    a data storage unit to store the advertising schedule and the plurality of video advertisements received via the network interface;
    at least one hardware processor; and
    memory comprising instructions that, when executed by the at least one hardware processor, cause the at least one hardware processor to execute a host process to initiate a plurality of instance processes to execute concurrently, each of the instance processes being assigned a distinct subset of the multiple video program channels, each of the instance processes comprising:
        a transport stream analysis module to analyze the at least one first video transport stream to determine advertisement insertion points of the distinct subset of the multiple video program channels; and
        a video advertisement insertion module to insert at least some of the plurality of video advertisements into the distinct subset of the multiple video program channels based on the advertisement insertion points and the advertising schedule;
    the transport stream interface to transmit the multiple video program channels with the inserted video advertisements in at least one second video transport stream.

2. The system of claim 1, each of the instance processes further comprising:
    a memory management facility to de-allocate memory allocated for use by the instance process.

3. The system of claim 1, the video advertisement insertion module to insert the at least some of the plurality of video advertisements by replacing content portions of the distinct subset of the multiple video program channels with the at least some of the plurality of video advertisements.

4. The system of claim 1, the inserted video advertisements comprising video advertisements for a local audience, the content portions of the distinct subset of the multiple video program channels comprising video advertisements for a national audience.

5. The system of claim 1, each of the at least one first video transport stream and the at least one second video transport stream comprising Motion Picture Experts Group 2 (MPEG-2) data or MPEG-4 data.

6. The system of claim 1, the host process executing as a background service of an operating system executing on the at least one hardware processor, and the host process initiating the plurality of instance processes without adding additional background services.

7. The system of claim 1, at least one of the plurality of instance processes comprising a plurality of execution threads to execute concurrently within the at least one of the plurality of instance processes, the plurality of execution threads comprising at least one of the transport stream analysis module and the video advertisement insertion module.

8. The system of claim 1, the transport stream interface comprising:
    at least one input buffer to receive the at least one first video transport stream;
    a de-multiplexer to separate the at least one first video transport stream into individual video program channel streams;
    a multiplexer to join the individual video program channel streams with the inserted video advertisements into the at least one second video transport stream; and
    at least one output buffer to transfer the at least one second video transport stream.

9. The system of claim 1, the host process and the plurality of instance processes communicating therebetween using named pipes.

10. The system of claim 1, the transport stream interface comprising an Asynchronous Serial Interface (ASI).

11. The system of claim 1, the transport stream interface comprising an Internet Protocol (IP) interface.

12. The system of claim 1, wherein the host process is configured to initiate a number of the plurality of instance processes sufficient to limit a continuous execution time of each of the plurality of instances to less than or equal to one second.

13. The system of claim 5, the transport stream analysis module to detect digital program insertion (DPI) packets to determine the advertisement insertion points.

14. The system of claim 11, the transport stream interface to receive the at least one first video transport stream and to transmit the at least one second video transport stream via IP multicast, the at least one first video transport stream being associated with a first IP multicast group address, and the at least one second video transport stream being associated with a second IP multicast group address.

15. The system of claim 14, further comprising:
a secondary device comprising the transport stream interface, the network interface, the data storage unit, the at least one hardware processor, and the memory;
the transport stream interface of the secondary device further to receive at least one third video transport stream from a primary device via the second IP multicast group address;
at least one of the host process and the plurality of instance processes of the secondary device to detect an interruption of the at least one third video transport stream from the primary device; and
the transport stream interface of the secondary device to transmit the multiple video programs with the inserted video advertisements in the at least one second video transport stream via the second IP multicast group address in response to the detected interruption.

16. The system of claim 15, wherein:
the at least one of the host process and the plurality of instance processes of the secondary device is further to transmit a message to the primary device in response to the detected interruption to cease transmission of the at least one third video transport stream.

17. The system of claim 15, wherein:
the at least one of the host process and the plurality of instance processes of the secondary device is further to detect a presence of the at least one third video transport stream from the primary device; and
the transport stream interface of the secondary device is further to cease transmission of the at least one second video transport stream in response to the detected presence.

18. The system of claim 15, wherein:
the secondary device is further to receive a message from the primary device; and
the transport stream interface of the secondary device is further to cease transmission of the at least one second transport stream in response to the message.

19. A method of inserting video advertising, comprising:
receiving multiple video program channels in at least one first video transport stream;
accessing an advertising schedule and a plurality of video advertisements;
executing a host process on at least one hardware processor, the host process to initiate a plurality of instance processes to execute concurrently on the at least one hardware processor, each of the instance processes being assigned a distinct subset of the multiple video program channels, each of the instance processes to:
analyze the at least one first video transport stream to determine advertisement insertion points of the distinct subset of the multiple video program channels; and
insert at least some of the plurality of video advertisements into the distinct subset of the multiple video program channels based on the advertisement insertion points and the advertising schedule; and
transmitting the multiple video program channels with the inserted video advertisements in at least one second video transport stream.

20. The method of claim 19, each of the instance processes further to de-allocate memory allocated for use by the instance process.

21. A non-transitory computer-readable storage medium comprising instructions that, when executed by at least one hardware processor of a machine, cause the machine to perform operations comprising:
receiving multiple video program channels in at least one first video transport stream;
accessing an advertising schedule and a plurality of video advertisements;
executing a host process to initiate a plurality of instance processes, each of the instance processes being assigned a distinct subset of the multiple video program channels, each of the instance processes to:
analyze the at least one first video transport stream to determine advertisement insertion points of the distinct subset of the multiple video program channels; and
insert at least some of the plurality of video advertisements into the distinct subset of the multiple video program channels based on the advertisement insertion points and the advertising schedule; and
transmitting the multiple video program channels with the inserted video advertisements in at least one second video transport stream.

\* \* \* \* \*